United States Patent [19]
Haskell

[11] Patent Number: 5,148,623
[45] Date of Patent: Sep. 22, 1992

[54] DOWNRIGGER WEIGHT AND METHOD

[76] Inventor: Robert K. Haskell, 825 Wikiup Dr., Santa Rose, Calif. 95403

[21] Appl. No.: 602,168

[22] Filed: Oct. 23, 1990

[51] Int. Cl.[5] .............................................. A01K 95/00
[52] U.S. Cl. ....................................................... 43/43.13
[58] Field of Search ............... 43/43.12, 43.13, 43.1, 43/42.22, 43.14; 29/525.1

[56] References Cited

U.S. PATENT DOCUMENTS

| | | | |
|---|---|---|---|
| 2,741,067 | 4/1956 | Cox | 43/44.9 |
| 2,883,787 | 4/1959 | Dahl | 43/43.13 |
| 2,923,085 | 2/1960 | Dahl | 43/43.13 |
| 2,976,642 | 3/1961 | Wickman et al. | 43/43.13 |
| 3,153,298 | 10/1964 | Lemon | 43/43.13 |
| 3,362,099 | 1/1968 | Morse | 43/43.13 |
| 3,643,370 | 2/1972 | Cook et al. | 43/43.12 |
| 3,874,109 | 4/1975 | Peterson | 43/42.22 |
| 4,212,127 | 7/1980 | Daniels | 43/43.13 |
| 4,361,976 | 12/1982 | Svoma | 43/43.1 |

FOREIGN PATENT DOCUMENTS

| | | | |
|---|---|---|---|
| 1148326 | 12/1957 | France | 43/43.13 |
| 2131262A | 6/1984 | United Kingdom | 43/43.1 |

*Primary Examiner*—Richard K. Seidel
*Assistant Examiner*—Jeanne M. Elpel
*Attorney, Agent, or Firm*—Shlesinger, Arkwright & Garvey

[57] ABSTRACT

A down rigger weight includes a body having oppositely disposed first and second surfaces. First and second weights are provided and each of the weights substantially overlies one of the surfaces and the weights are of substantially equal dimension and weight. A nut and bolt secures the weights to the body. At least a first eyelet is secured to and extends from the first weight. A locking system is operably associated with the first weight for preventing rotation thereof about the nut and bolt.

18 Claims, 4 Drawing Sheets

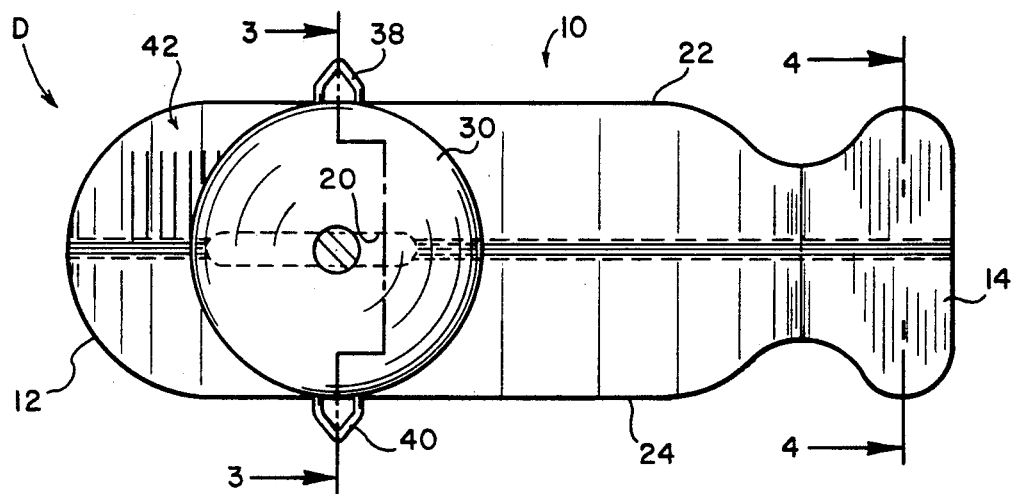
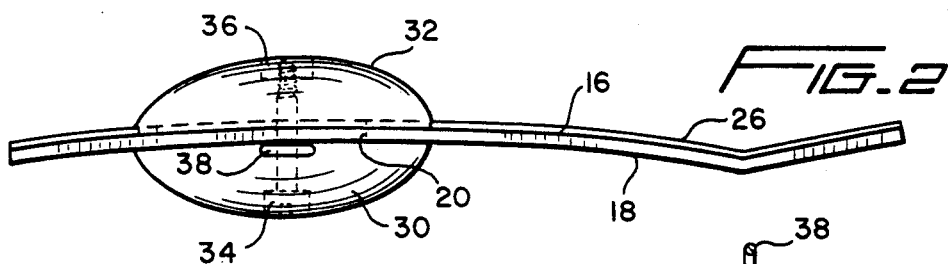
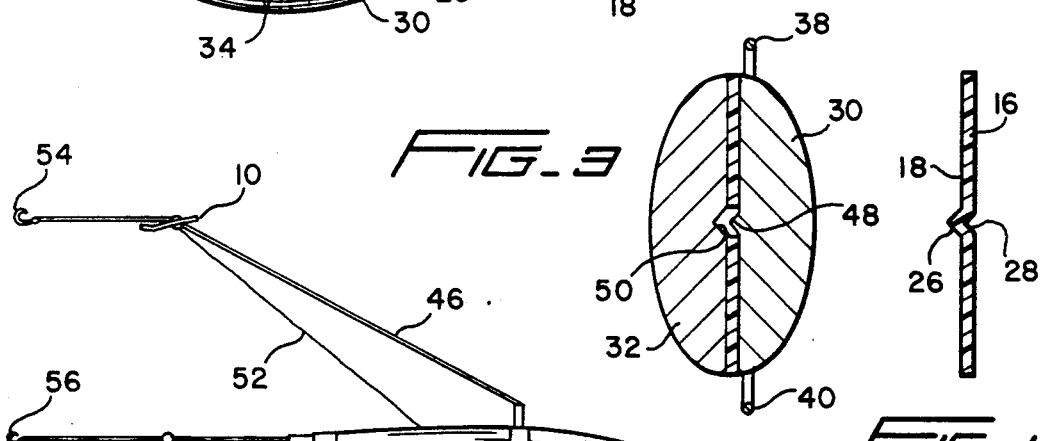
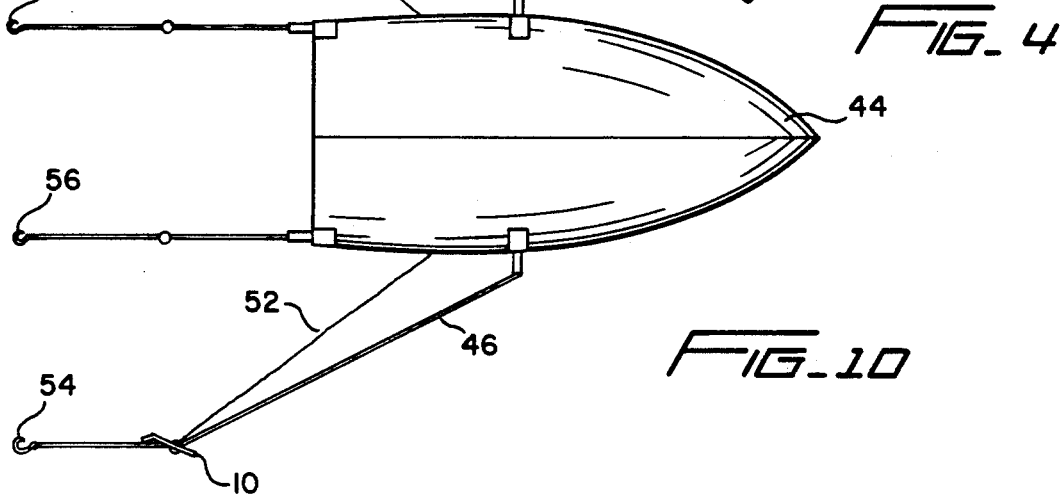
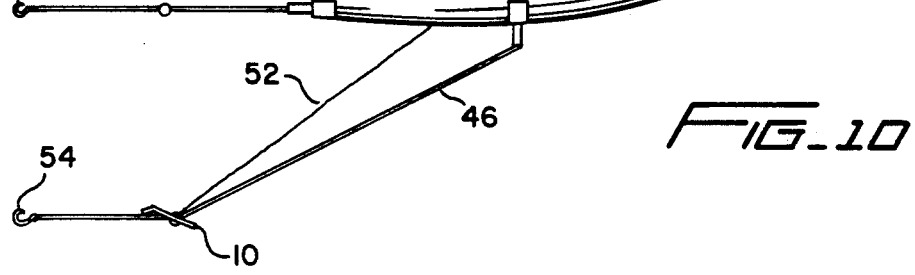

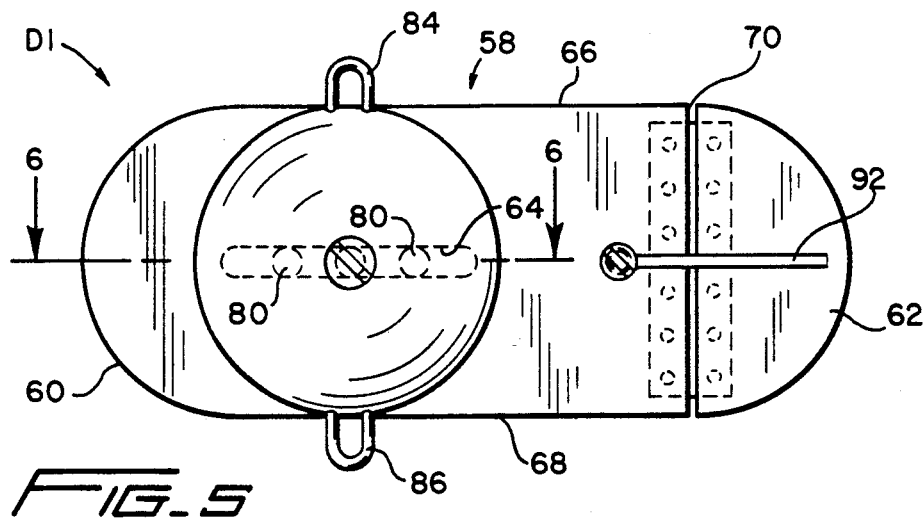
FIG_5
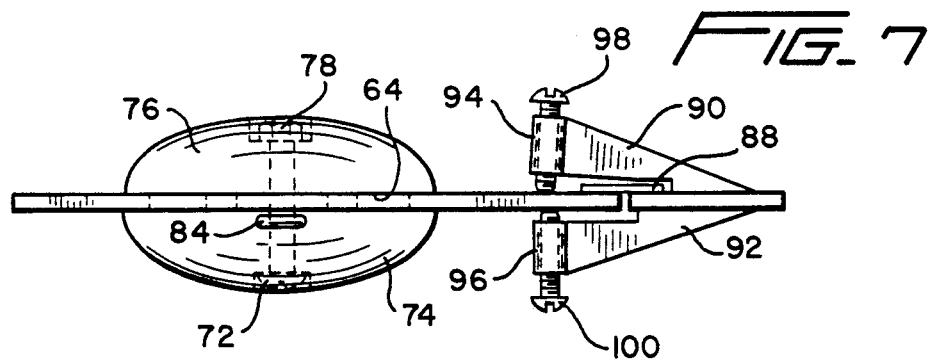
FIG_7
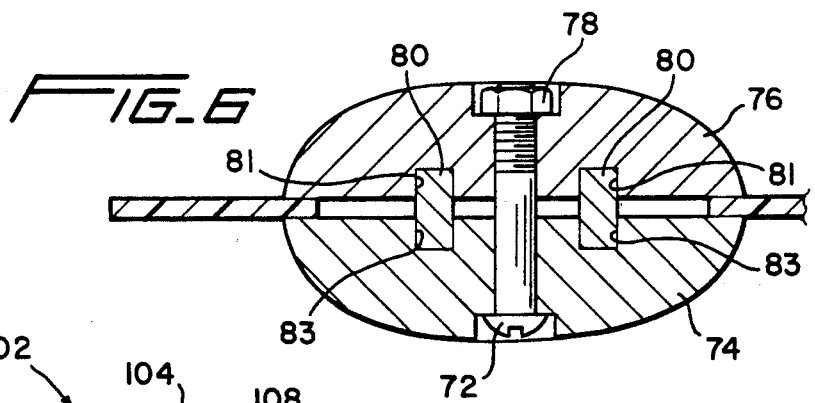
FIG_6
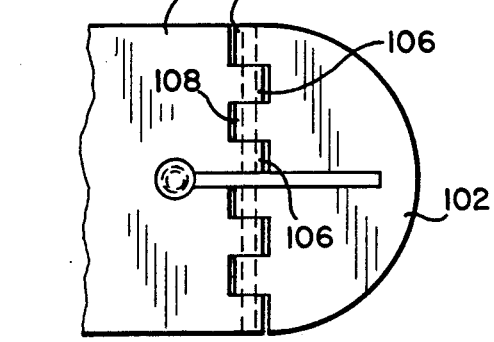
FIG_8
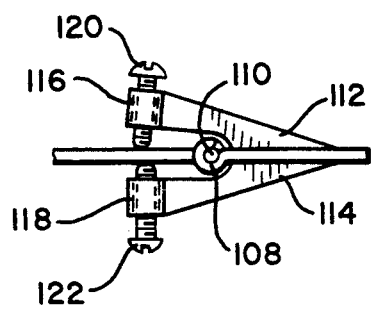
FIG_9

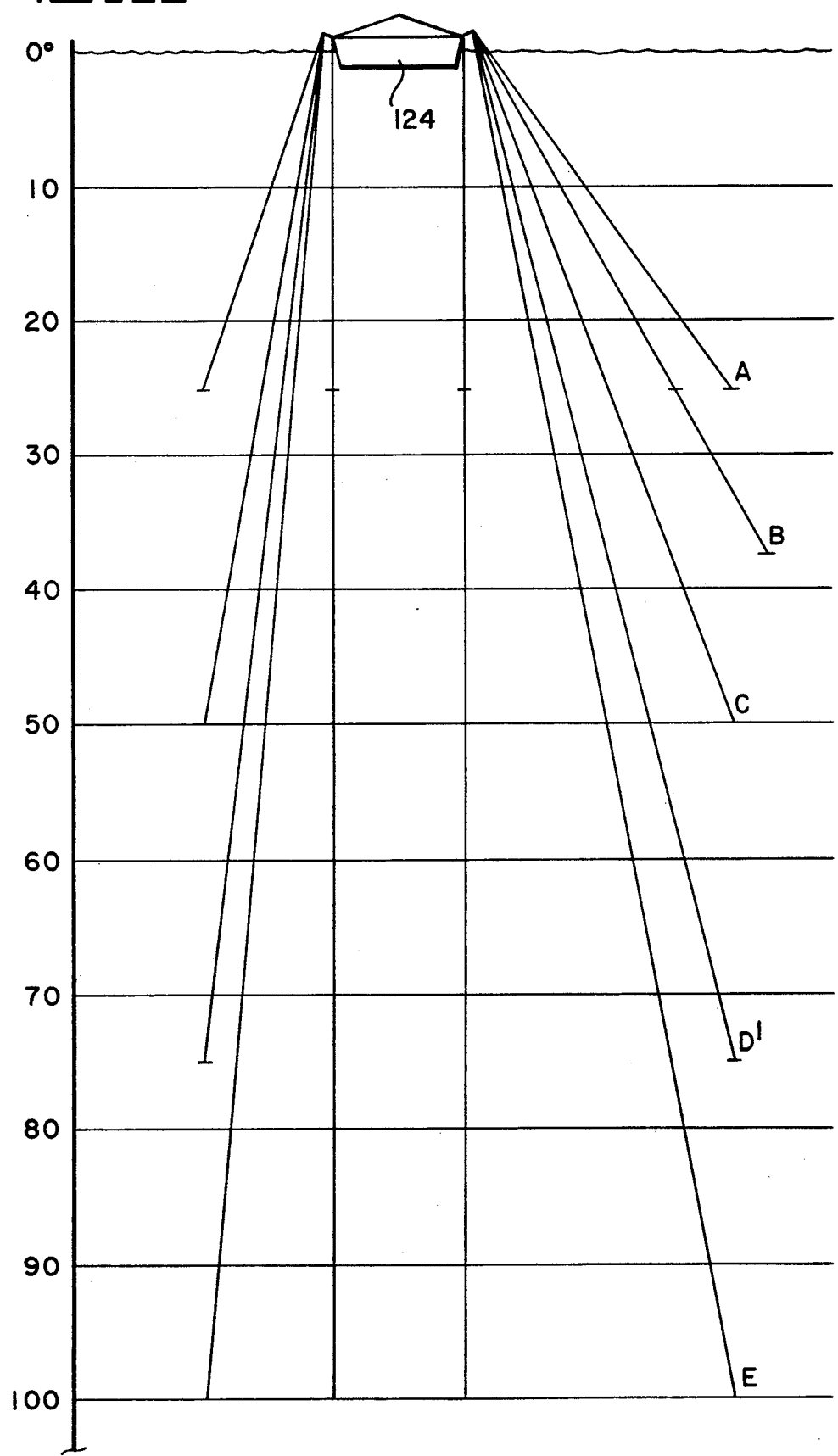

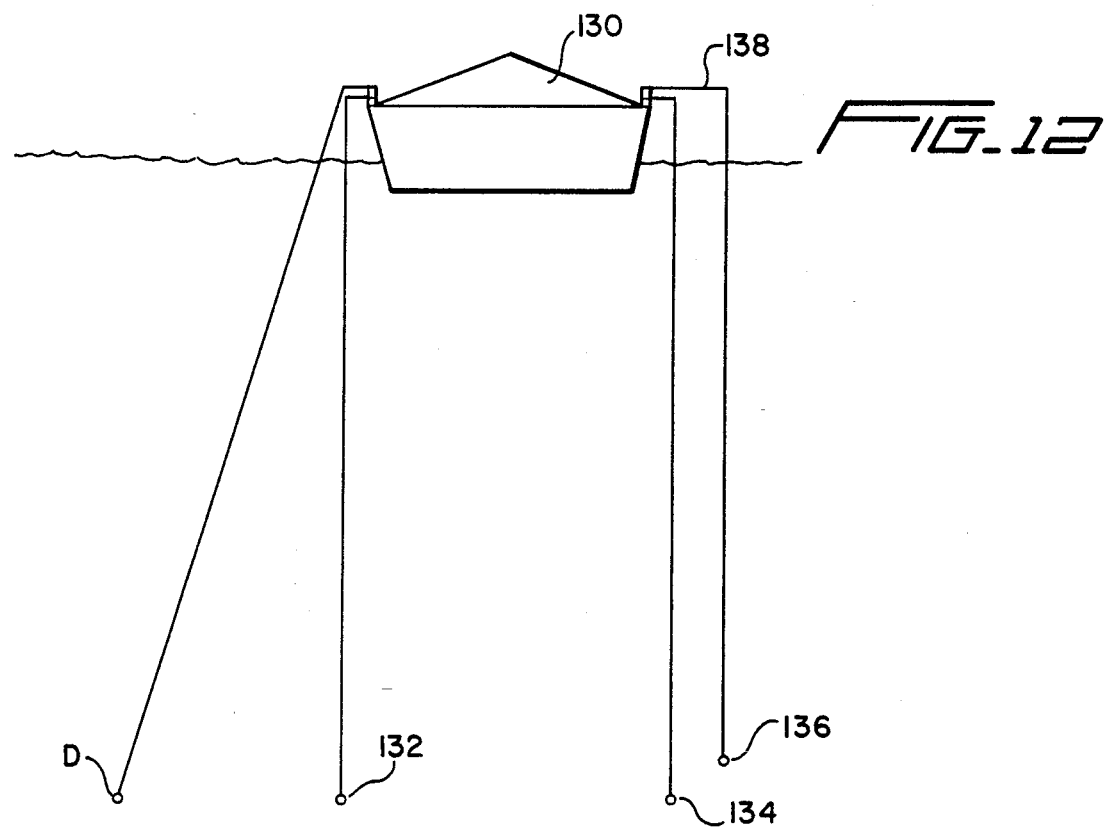
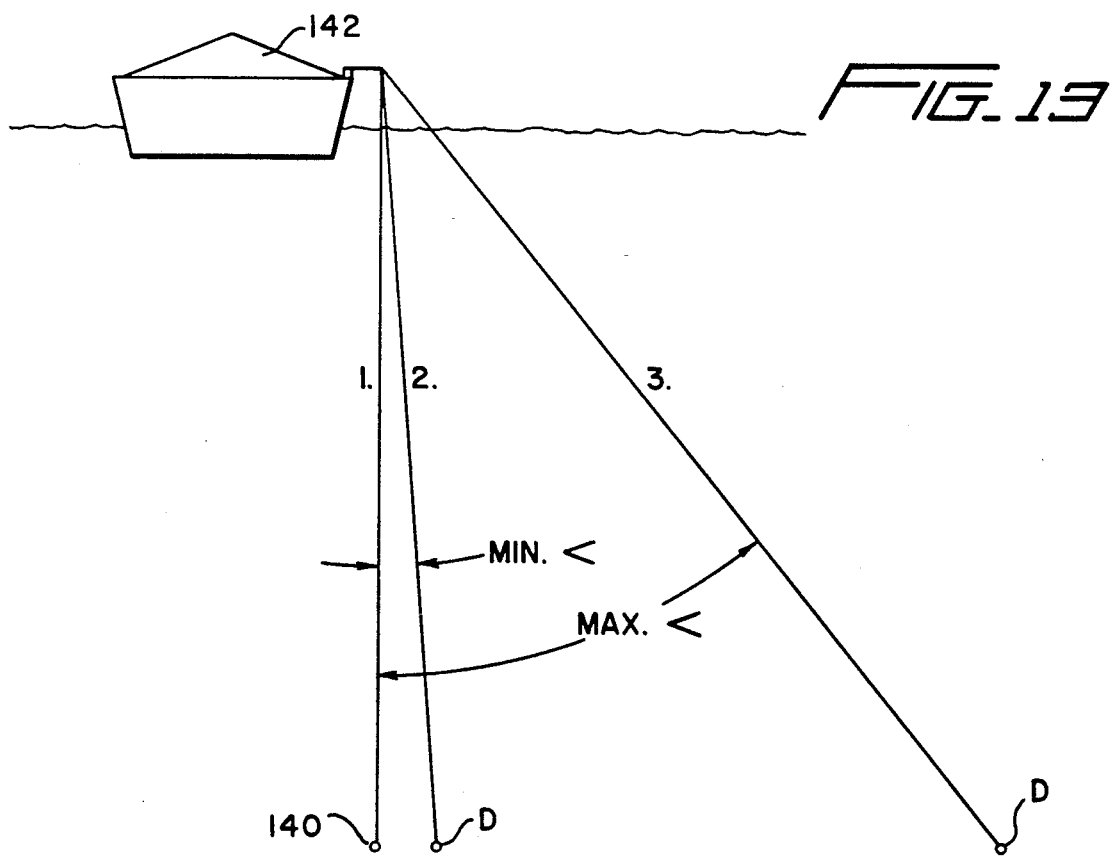

DOWNRIGGER WEIGHT AND METHOD

BACKGROUND OF THE INVENTION

Fish tend to seek that level in a body of water having a preferred temperature, salinity, and/or concentration of food. The level may be relatively far below the surface, so that a fisherman must have some means of positioning his bait or lure at that level if fish are to be caught. This is particularly true where the bait or lure is trolled from a moving boat. Furthermore, since most fishing boats troll with a number of lines, there must be some means for spacing the baits and thereby precluding the lines from becoming tangled.

The prior art discloses a number of devices designed to carry the bait or lure a substantial distance below the surface of the water. These devices typically utilize a weight which is towed from the boat through the provision of a heavy line controlled by a specially designed reel. Intermediate the water surface and the weight usually is a device for securing the fishing line thereto, and for permitting the fishing line to be released when a fish is hooked. These prior art devices do, however, suffer from a number of drawbacks involving complexity of design, inability to control lateral spacing and the like.

The disclosed down rigger weight assembly overcomes the mentioned drawbacks and provides an assembly which is relatively easy to construct, permits selective lateral spacing of the down rigger system, and has means for maintaining the lateral spacing as the weight is trolled.

OBJECTS AND SUMMARY OF THE INVENTION

The primary object of the disclosed invention is a down rigger weight assembly which is relatively simple in implementation, and which permits selected lateral spacing of the assembly as it is trolled.

Yet a further object of the disclosed invention is a method for assembling a down rigger weight assembly which is relatively easy to implement and which assures that the lateral spacing is maintained as the assembly is trolled.

A down rigger weight according to the invention includes a body having oppositely disposed first and second surfaces. First and second weights are provided, and each of the weights substantially overlies one of the surfaces and the weights are of substantially equal dimension and weight. Means operably secure each weight to the body, and at least a first eyelet extends from the first weight. Means are operably associated with the first weight for preventing movement of the eyelet relative to the body.

The method of assembling a down rigger weight assembly according to the invention includes the steps of providing a body having oppositely disposed side surfaces and a slot therethrough intermediate front and tail sections thereof. First and second weights of substantially uniform dimension and weight are provided, and an eyelet extends from one of the weights. Each of the weights is juxtaposed to a cooperating surface of the body, so that the eyelet extends parallel to and beyond the cooperating side surface. The weights are secured to the body by means extending therebetween and through the slot. At least the first weight is provided with means preventing rotation of the first weight about the securing means, for thereby fixing the eyelet relative to the body.

These and other objects and advantages of the invention will be readily apparent in view of the following description and drawings of the above description invention.

DESCRIPTION OF THE DRAWINGS

The above and other objects and advantages and novel features of the present invention will become apparent from the following detailed description of the preferred embodiment of the invention, illustrated in the accompanying drawings, wherein:

FIG. 1 is a side elevational view of a first embodiment of the down rigger weight assembly of the invention;

FIG. 2 is a top plan view thereof;

FIG. 3 is a cross-sectional view taken along the line 3—3 of FIG. 1 and viewed in the direction of the arrows;

FIG. 4 is a cross-sectional view taken along the line 4—4 of FIG. 1 and viewed in the direction of the arrows;

FIG. 5 is a side elevational view of a second embodiment of the invention;

FIG. 6 is a cross-sectional view taken along the lines 6—6 of FIG. 5 and viewed in the direction of the arrows;

FIG. 7 is a top plan view of FIG. 5;

FIG. 8 is a fragmentary side elevational view of a tail section used with the down rigger weight of FIG. 5;

FIG. 9 is a top plan view of FIG. 8;

FIG. 10 is a bottom plan view of a boat using the down rigger control weight assemblies of the invention;

FIG. 11 is a schematic view illustrating lateral spacing of the assemblies as a function of depth;

FIG. 12 is a schematic view of a boat using the down rigger weight system of the invention in combination with a conventional system; and, FIG. 13 is a schematic review illustrating the lateral spacing available with the down rigger weight system of the invention.

DETAILED DESCRIPTION OF THE INVENTION

Down rigger assembly D includes a body 10, as best shown in FIGS. 1-4. Body 10 has a front section 12 of arcuate configuration and a tail section 14 angularly disposed relative to front section 12 and somewhat resembles a fish. The assembly D is, preferably, comprised of stainless steel or like material which will withstand the corrosive element into which the assembly D may be placed. The assembly D is, preferably, relatively thin and has oppositely disposed side surfaces 16 and 18.

Longitudinally extending slot 20 is formed in assembly D intermediate parallel side edges 22 and 24 thereof. The slot 20 is, preferably, equidistant the edges 22 and 24 and is aligned with and extends along key 26 integral with body 10, as best shown in FIG. 4. A corresponding groove 28 is formed in surface 16 in alignment with key 26. Groove 28 extends substantially the length of surface 16. The slot 20, as best shown in FIGS. 1 and 2, has a length substantially less than the length of key 26 and groove 28 and is relatively forwardly disposed. The key 26 strengthens body 10 and prevents bending transverse to the key 26.

Cast lead weights 30 and 32 are juxtaposed to surfaces 16 and 18, respectively, and are secured thereto by bolt 34 and nut 36, although other fastening means will be apparent to those skilled in the art. The head of bolt 34 and the nut 36 are positioned within recesses formed in the respective weights. Bolt 34 has a shank which extends through slot 20. The weights 30 and 32 are, preferably, round in elevation, and have a diameter less than the distance between side edges 22 and 24 in order to substantially overlie surfaces 16 and 18 and not protrude therebeyond. The weights 30 and 32 are, preferably, comprised of lead or some similar dense material of sufficient weight to cause the assembly D to be submersed as the assembly D is towed and for the assembly D to assume a diving attitude due to the forward position attributable to slot 20. Eyelets 38 and 40 extend from opposite sides of the weight 32, and are disposed parallel to and extend beyond assembly D and its cooperating edges 22 and 24, respectively, in order to provide a convenient attachment point for the tow line. The overall appearance of the assembly D and the weights 30 and 32 therefore somewhat resembles a fish as the assembly D is towed through the water.

Surface 18 has markings 42 proximate front 12. I have found that selective positioning of the weights 30 and 32 along the assembly D has the effect of regulating the distance by which the assembly D is laterally spaced from a boat, such as the boat 44 of FIG. 10, as the assembly D is towed through the water. Therefore, by appropriately placing the markings 42 on surface 18, I thereby provide a means by which the user may select the distance that the assembly D is to be laterally spaced from the boat 44. Since a bolt 34 and nut 36 are used to secure the weights 30 and 32 to the assembly D, then loosening them allows the weights 30 and 32 to be slid in the slot 20 until the appropriate marking has been selected. Upon being appropriately positioned, then the bolt 34 and nut 36 can then again be tightened.

I have found that there is a tendency for the weight 30 to rotate about the bolt 34 as the assembly D is towed through the water. Rotation of the weight 30 causes corresponding rotation of the eyelets 38 and 40, to one of which the tow line 46 of FIG. 10 is attached, and the effect of which corresponds to movement of the weights 30 and 32 along the slot 20. In other words, rotation of the eyelets 38 and 40 about the bolt 34 causes the lateral spacing of the assembly D to be changed from the preselected position. For this reason, I provide key 26 and groove 28.

As best shown in FIG. 3, weight 30 has a tongue 48 which is received within groove 28, as best shown in FIG. 2. A recess 50 extends along weight 32 and receives key 26. Cooperation of the recess 50 with the key 26 and the tongue 48 with the groove 28 has the effect of causing the weights 30 and 32 to be prevented from rotating about the bolt 34. Therefore, once the user sets the lateral spacing, as denoted by the markings 42, the there is little possibility that the lateral spacing will be altered by rotation of the eyelets 38 and 40.

FIG. 10 illustrates two assemblies D being towed from boat 44. Each of the assemblies D has a tow line 46 secured to its eyelet 38 or 40, respectively. Those skilled in the art will appreciate that connection to the eyelet 38 will have the effect of causing the assembly D to be moved upwardly as viewed in FIG. 10, while connection to the eyelet 40 will have the effect of causing the assembly D to be moved downwardly as viewed in FIG. 10. Therefore, the same down rigger control assembly D may be used regardless of the side of the boat 44, since it is necessary to merely select the appropriate eyelet 38 or 40.

As is well known, a fishing line connection mechanism (not shown) extends from the eyelet 38 or 40 to the tow line 46. The fishing line connection mechanism has a means for receiving a fishing line 52 and for causing the fishing line to be towed along with the connected assembly D. A hook 54, which might be for bait or part of a lure, may be selectively positioned relative to the assembly D. The fishing line connector mechanism has means for causing the fishing line 52 to be released when a fish hits, thereby permitting the fisherman to enjoy the catching of the fish without being required to also overcome the weight of the down rigger assembly D of FIG. 1. It can be seen in FIG. 10 that each of the down rigger assemblies D is laterally spaced relative to the boat 44, and also relative to the hooks 56 towed directly astern. The hooks 56 themselves may, in fact, be secured to a down rigger control assembly D which has been set for no lateral spacing. Also, as will be understood, a greater or few number of down rigger assemblies D may be used as preferred.

Down rigger control weight D1 is best shown in FIGS. 5–7, and includes a planar stainless steel body 58 having an arcuate front portion 60 and an arcuate, yet separate, tail portion 62.

Body 58 has longitudinally extending slot 64 substantially equidistant side edges 66 and 68. The slot 64 is intermediate front 60 and transverse end 70. Bolt 72 extends through weight 74 and slot 64. Bolt 72 likewise extends through weight 76 and is secured by nut 78. Pins 80 extend between weights 74 and 76, and are received within recesses 81 and 83, respectively, formed in each of the substantially identical weights 74 and 76. Pins 80, as best shown in FIG. 5, preferably are round in elevation and have a diameter slightly less than the height of slot 64. The pins 80 are comprised of stainless steel, and prevent the weight 74 from rotating about the bolt 72 as the down rigger assembly D1 is towed through the water. The use of pins 80 received within recesses 81 and 83 simplifies the manufacture since substantially identical weights 74 and 76 are used and cast. As with the down rigger assembly D of FIG. 1, eyelets 84 and 86 extend from the weight 74 in order to provide an attachment point for the tow line.

Spring steel strip 88 is secured, such as by welding, to body 58 and tail 62 in order for securing same together. Links 90 and 92 each have a first end portion secured to tail 62. The opposite end portion of each has threaded sleeves 94 and 96, respectively, which receive screws 98 and 100, respectively. Adjustment of the screws 98 and 100 causes the tail section 62 to be selectively angularly disposed relative to planar body 58. This provides an additional means for adjusting the lateral spacing of the down rigger control assembly D1 relative to the boat. I prefer the use of spring steel for strip 88, since repeated flexing thereof will not result in the formation of cracks or the like.

FIGS. 8–9 disclose a further embodiment of a down rigger control assembly D2 having a modified tail connection. The down rigger control assembly D2 is substantially similar to the down rigger control assembly D1 of FIG. 5, with the primary difference being the means by which the tail 102 is connected to the body 104. Sleeves 106 are integral with body 104 and are interdigitated with corresponding sleeves 108 integral with tail 102. Pintle 110 extends through the aligned apertures of sleeves 106 and 108 and thereby provides a hinge about which the tail 102 may pivot.

As with the down rigger assembly D1 of FIG. 5, links 112 and 114 have a first end portion secured to tail 102 and an oppositely disposed end portion having an integral sleeve 116 and 118, respectively. Screws 120 and 122 are threadedly secured within the cooperating sleeves 116 and 118, respectively, in order to selectively position the tail 102 relative to the planar body 104.

FIG. 11 is a schematic diagram illustrating the lateral positioning of the down rigger weights of the invention relative to a boat 124 at various depths. For example, the down rigger weight A, at a depth of 25 feet, is laterally spaced 15.7 feet where the angle subtended is 39°. The down rigger weight B, on the other hand, for a corresponding laterally spacing need only subtend an angle of 31° at a spacing of approximately 33 feet. Down rigger weight C, on the other hand, at a depth of 50 feet will subtend an angle of 22°. Finally, down rigger weight D' need subtend an angle of 14° at a spacing of 75 feet, while the weight E need only subtend 11° at a depth of 100 feet. I propose that a chart be provided upon the sale of each of the down rigger assemblies D, D1 and D2 in order to instruct the user about the prescribed position of the weights, such as the weights 30 and 32, for a selected lateral spacing at a desired depth. The user will therefore be able to make certain that the baits are appropriately spaced from the boat regardless of depth.

FIG. 12 illustrates a boat 130 having a down rigger assembly D laterally spaced from weight 132 towed by conventional means from the port side. Weights 134 and 136 are towed from the starboard side and, as with weight 132, are of conventional design. In order to prevent tangling of the lines towing weights 134 and 136, it is conventional that one, such as weight 134, be set deeper than the other. Also, an outrigger 138 or like device is also used to laterally space the weight 136 relative to weight 134. The use of a weight 136 towed from outrigger 138 must be limited, as appreciated by those skilled in the art, because of the force applied to the tow line and transmitted thereby to outrigger 138. Down rigger weight assembly D, as illustrated in FIG. 12, needs no outrigger 138 and therefore increases the flexibility in fishing from boat 130.

FIG. 13 illustrates the spacing available for a given down rigger weight assembly D relative to spacing available for a given down rigger weight 140. Weight 140 cannot be selectively laterally spaced, while the down rigger weight assemblies D can be laterally spaced in order to be selectively positioned at the same depth. Therefore, the boat 142 may troll at the same depth essentially any number of lines through the use of down rigger assemblies D, and yet be assured that the lines will not become tangled and therefore unusable.

While this invention has been described as having a preferred design, it is understood that it is capable of further modifications, uses and/or adaptations of the invention following in general the principle of the invention and including such departures from the present disclosure as come within known or customary practice in the art to which the invention pertains, and as may be applied to the essential features herein set forth, and fall within the scope of the invention of the limits of the appended claims.

What I claim is:

1. A downrigger weight, comprising:
   a) a body having a front and a tail and oppositely disposed first and second surfaces;
   b) first and second weights, each of said weights substantially overlying one of said surfaces and said weights being of substantially equal dimension and weight, said first and second weights being positioned forward of said tail and positioned to regulate the distance said downrigger weight is displaced laterally from a boat;
   c) means operably securing said weights to said body;
   d) at least a first eyelet secured to and extending from one of said weights, said at least a first eyelet for a line to tow said downrigger weight through a body of water;
   e) means operably associated with said one weight for preventing rotation of said eyelet relative to said body;
   f) said preventing means including a groove in one of said surfaces, and a tongue integral with said one weight and received within said groove; and
   g) said groove extending substantially the length of said one surface for preventing bending of said body.

2. The weight of claim 1, wherein:
   a) said weights are secured to said body by a common securing means.

3. The weight of claim 2, wherein:
   a) said securing means extends through each of said weights and said body.

4. The weight of claim 2, wherein:
   a) said securing means includes a nut and bolt.

5. The weight of claim 4, wherein:
   a) said body has a first opening therein;
   b) said bolt has a head operably associated with a first of said weights and said nut is operably associated with the other of said weights; and
   c) said bolt extends through said opening.

6. The weight of claim 1, wherein:
   a) a slot is disposed in said body and is aligned with and interrupts said groove; and
   b) said securing means is releasably secured in said slot for permitting selective positioning of said weights relative to said body.

7. The weight of claim 1, wherein:
   a) a key extends from the other of said surfaces in alignment with said groove; and
   b) a recess extends along the other of said weights and receives said key.

8. The weight of claim 1, wherein:
   a) a second eyelet extends from said one weight substantially opposite to said first eyelet.

9. The weight of claim 8, wherein:
   a) said eyelets extend substantially parallel to said body and outwardly relative to associated side edges thereof.

10. The weight of claim 1, wherein said preventing means includes:
    a) first and second spaced pins; and
    b) a pair of recesses in each of said weights, each of said pins received in one recess of each weight.

11. The weight of claim 12, wherein:
    a) said securing means includes a bolt extending from said first weight and through said slot.

12. The weight of claim 1, wherein:
    a) said body has a front and a tail; and
    b) a slot is disposed in said body intermediate said front and tail.

13. The weight of claim 12, wherein:
    a) said preventing means is disposed rearwardly relative to said securing means.

14. The weight of claim 12, wherein:
a) said tail includes a rudder portion angularly disposed relative to said front.

15. The weight of claim 14, wherein:
a) means are operably associated with said body and with said rudder portion for maintaining said rudder portion at a preselected angular orientation relative to said front.

16. The weight of claim 2, wherein:
a) said body is planar and has arcuate front and tail sections.

17. The method of assembling a downrigger weight, comprising the steps of:
a) providing a body having a front and a tail and oppositely disposed side surfaces and a slot therethrough intermediate front and tail sections thereof;
b) providing first and second weights of substantially uniform dimension and weight, and from one of which an eyelet extends, and said eyelet for a line to tow said downrigger weight through a body of water;
c) juxtaposing each of the weights to a cooperating surface of the body so that the weights are forward of the tail and the eyelet extends parallel to and beyond the cooperating side surface;
d) detachably securing the weights to the body by means extending therebetween and through the slot, therein said weights are positioned to regulate the distance said downrigger weight is displaced laterally from a boat; and
e) providing at least the first weight with means preventing rotation of the first weight about the securing means and thereby fixing the eyelet relative to the body.

18. A downrigger weight, comprising:
a) a body having oppositely disposed first and second surfaces;
b) first and second weights, each of said weights substantially overlying one of said surfaces and said weights being of substantially equal dimension and weight;
c) means operably securing said weights to said body, said securing means including variable positioning means for varying the position of said weights relative to said body, wherein said weights are positioned to regulate the distance said downrigger weight is displaced laterally from a boat;
d) at least a first eyelet secured to and extending from one of said weights, said at least a first eyelet for a line to tow said downrigger weight through a body of water; and
e) means operably associated with said one weight for preventing rotation of said eyelet to said body.

* * * * *